(12) United States Patent
Osada et al.

(10) Patent No.: US 12,168,259 B2
(45) Date of Patent: Dec. 17, 2024

(54) POWER TOOL

(71) Applicant: Koki Holdings Co., Ltd., Tokyo (JP)

(72) Inventors: Yoshiaki Osada, Ibaraki (JP); Shinji Kuragano, Ibaraki (JP); Takeru Kumakura, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 258 days.

(21) Appl. No.: 17/625,769

(22) PCT Filed: Jun. 26, 2020

(86) PCT No.: PCT/JP2020/025221
§ 371 (c)(1),
(2) Date: Jan. 9, 2022

(87) PCT Pub. No.: WO2021/010136
PCT Pub. Date: Jan. 21, 2021

(65) Prior Publication Data
US 2022/0241877 A1    Aug. 4, 2022

(30) Foreign Application Priority Data

Jul. 12, 2019 (JP) ................................. 2019-130336

(51) Int. Cl.
*B23D 47/02*   (2006.01)
*B27B 9/04*    (2006.01)

(52) U.S. Cl.
CPC ................ *B23D 47/02* (2013.01); *B27B 9/04* (2013.01)

(58) Field of Classification Search
CPC ........ B23D 47/02; B23D 47/12; B23D 45/16; B23D 59/002; B23B 9/04; B27B 9/02; B23Q 9/0028

(Continued)

(56) References Cited

U.S. PATENT DOCUMENTS 3,661,376 A * 5/1972 Hill ..................... B23Q 1/5412
                                              269/75
4,628,608 A * 12/1986 Kuhlmann ........... B23Q 9/0028
                                              30/373

(Continued)

FOREIGN PATENT DOCUMENTS

CN        2542870      4/2003
CN      101642830     2/2010

(Continued)

OTHER PUBLICATIONS

"Search Report of Europe Counterpart Application", issued on Sep. 7, 2022, pp. 1-8.

(Continued)

*Primary Examiner* — Ghassem Alie
(74) *Attorney, Agent, or Firm* — JCIPRNET

(57) ABSTRACT

Provided is a power tool capable of suitably fixing an auxiliary member to a base pedestal. The power tool has a base having a sliding surface capable of sliding on a workpiece, and an auxiliary member that is attachable to the base and has a guiding surface. The power tool also has a wing bolt and a leaf spring as a pressing mechanism capable of pressing an extension part of the auxiliary member. An operator can change a pressing force of the wing bolt to the auxiliary member by changing the position of the wing bolt in a pressing direction. The leaf spring applies a predetermined pressing force to the auxiliary member even in the absence of the pressing force of the wing bolt to the auxiliary member.

5 Claims, 4 Drawing Sheets

(58) Field of Classification Search
USPC ...... 83/870, 745; 30/373, 371, 391; 411/112
See application file for complete search history.

(56) References Cited

U.S. PATENT DOCUMENTS

| | | | | |
|---|---|---|---|---|
| 7,516,552 | B2* | 4/2009 | Yoshida | B27B 9/04 |
| | | | | 30/373 |
| 2003/0000091 | A1* | 1/2003 | Havenstein | B23D 59/003 |
| | | | | 30/392 |
| 2009/0044677 | A1 | 2/2009 | Wilson et al. | |
| 2012/0192437 | A1* | 8/2012 | Haas | B25H 1/0078 |
| | | | | 30/373 |
| 2021/0362365 | A1 | 11/2021 | Aoyama | |

FOREIGN PATENT DOCUMENTS

| | | |
|---|---|---|
| CN | 201841313 | 5/2011 |
| CN | 202759033 | 2/2013 |
| CN | 204088588 | 1/2015 |
| CN | 206516771 | 9/2017 |
| CN | 206673127 | 11/2017 |
| CN | 207127333 | 3/2018 |
| EP | 0933537 | 8/1999 |
| EP | 1231007 | 8/2002 |
| JP | 2002370203 | 12/2002 |
| JP | 2008074032 | 4/2008 |
| JP | 2012116048 | 6/2012 |
| JP | 2013078864 | 5/2013 |
| JP | 2013248740 | 12/2013 |
| JP | 2015066654 | 4/2015 |
| JP | 2018039100 | 3/2018 |

OTHER PUBLICATIONS

"International Search Report (Form PCT/ISA/210) of PCT/JP2020/025221", mailed on Sep. 24, 2020, with English translation thereof, pp. 1-4.
"Office Action of China Counterpart Application" with English translation thereof, issued on Feb. 23, 2024, p. 1-p. 21.
"Office Action of China Counterpart Application", issued on Aug. 28, 2024, with English translation thereof, p. 1-p. 25.

* cited by examiner

POWER TOOL

CROSS-REFERENCE TO RELATED APPLICATION

This application is a 371 application of the International PCT application serial no. PCT/JP2020/025221, filed on Jun. 26, 2020, which claims the priority benefits of Japan Patent Application No. 2019-130336, filed on Jul. 12, 2019. The entirety of each of the above-mentioned patent applications is hereby incorporated by reference herein and made a part of this specification.

TECHNICAL FIELD

The invention relates to a power tool such as a circular saw.

BACKGROUND ART

The following Patent Literature 1 relates to a circular saw. This circular saw has a split base and can improve workability by changing a work type in such a manner that a sub-base (split piece) is removed from a base pedestal. The sub-base is fixed to the base pedestal in such a manner that a bar extending from the sub-base is engaged with the base pedestal and an operation knob is rotated so that a tip of a bolt member (or a cam member) to be screwed is pressed against the bar.

CITATION LIST

Patent Literature

[Patent Literature 1]
Japanese Laid-open No. 2013-78864

SUMMARY OF INVENTION

Technical Problem

In the conventional circular saw, since the engagement between the bar of the sub-base and the base pedestal is loose in order to smoothly attach the sub-base to the base pedestal, there is a case in which the position of the sub-base may change when a bolt is rotated after the sub-base is set to a desired position of the base pedestal. There is a similar problem when an auxiliary member other than the sub-base, such as a guide or a right-angled ruler, is fixed to the base pedestal.

The invention has been made in view of such circumstances and an objective is to provide a power tool capable of suitably fixing an auxiliary member to a base pedestal.

Solution to Problem

An aspect of the invention relates to a power tool. This power tool includes a main body part which supports a motor and a cutting blade; a base pedestal which supports the main body part and includes a sliding surface slidable on a processed material; an auxiliary member that is attachable to the base pedestal and includes at least one guide surface; and a pressing mechanism which is provided in the base pedestal and is able to press a part of the auxiliary member, wherein the pressing mechanism includes a main pressing part which is able to change a pressing force to the auxiliary member by changing a relative position with the auxiliary member in a pressing direction and an auxiliary pressing part which is able to give a pressing force to the auxiliary member at least in a state without a pressing force by the main pressing part.

The auxiliary member may include an extension part which extends from the guide surface and is engageable with the base pedestal, and the pressing mechanism may press the extension part.

The base pedestal may include an insertion part into which the extension part is inserted, and the auxiliary pressing part may be a leaf spring which is provided to face the insertion part and is elastically deformed by the extension part inserted into the insertion part.

The leaf spring may include a curved part which is curved to protrude toward the leaf spring.

A contact part which applies a pressing force to the auxiliary member in the main pressing part may move in a direction intersecting the pressing direction in accordance with a change in the relative position of the main pressing part, and the auxiliary pressing part whose movement in the direction intersecting the pressing direction is regulated may be interposed between the contact part and the auxiliary member.

The main pressing part may be a bolt, the pressing direction may be an axial direction of the bolt, and the direction intersecting the pressing direction may be a rotation direction of the bolt.

The power tool may further include a coil spring which is provided around a shaft part of the bolt, and the coil spring may regulate a movement of the auxiliary pressing part in a direction away from the auxiliary member.

The auxiliary pressing part may elastically bias the auxiliary member.

Any combination of the above-described components and a conversion of the expression of the invention between methods, systems, and the like are also effective as aspects of the invention.

Advantageous Effects of Invention

According to the invention, it is possible to provide a power tool capable of suitably fixing an auxiliary member to a base pedestal.

DESCRIPTION OF EMBODIMENTS

Figure 1:
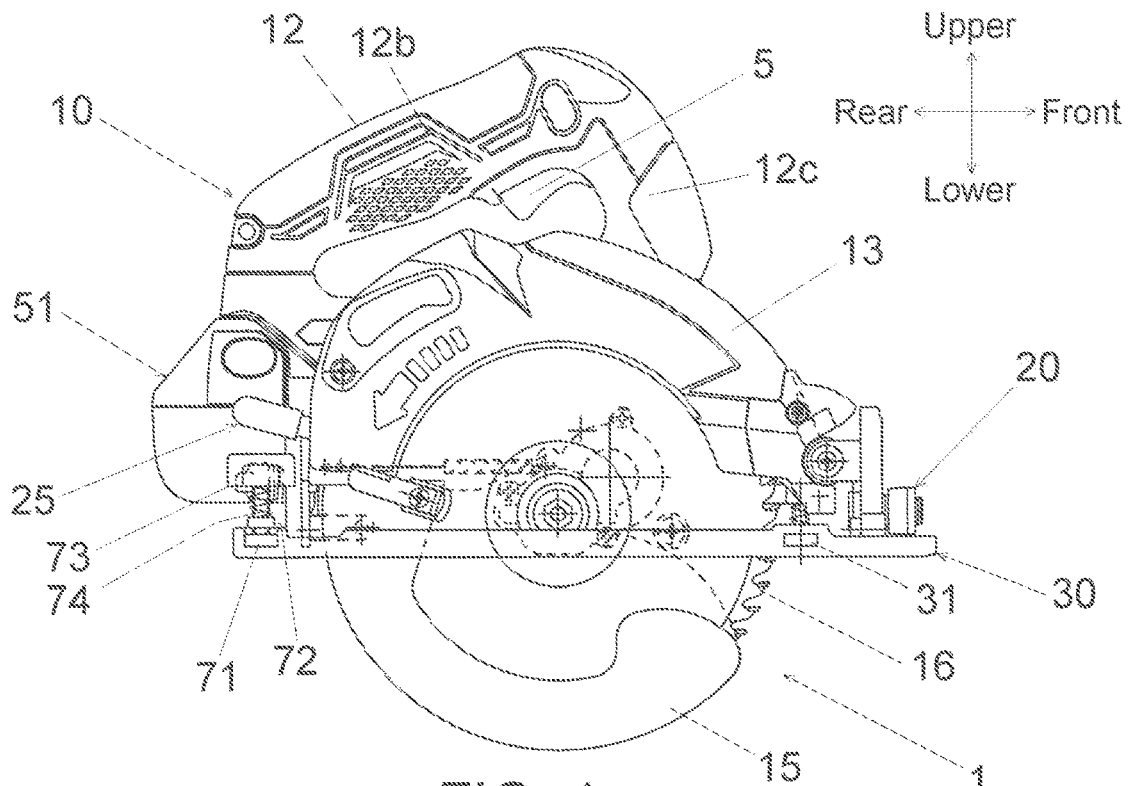
FIG. 1 is a right side view of a power tool 1 according to an embodiment of the invention.

Hereinafter, the same or equivalent components, members, and the like shown in the drawings are designated by the same reference numerals, and duplicate description thereof will be omitted as appropriate. The embodiment does not limit the invention and is an example. Not all features and combinations thereof described in the embodiments are necessarily essential to the invention.

Figure 5:
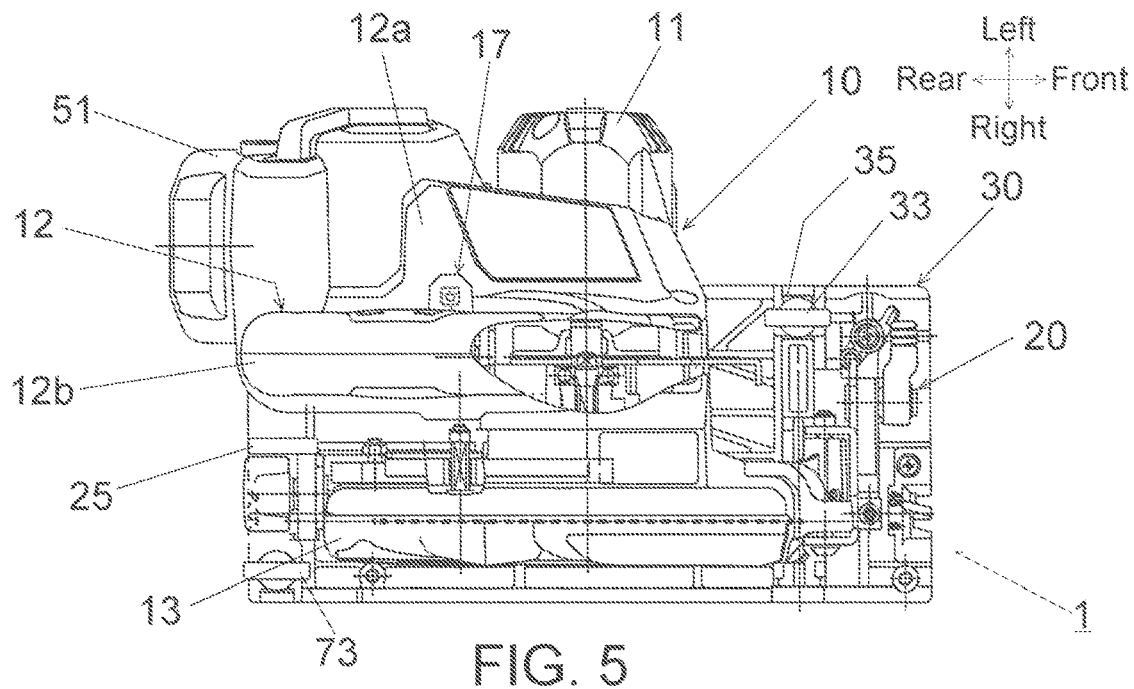
FIG. 5 is a plan view of the power tool 1.
Figure 6:
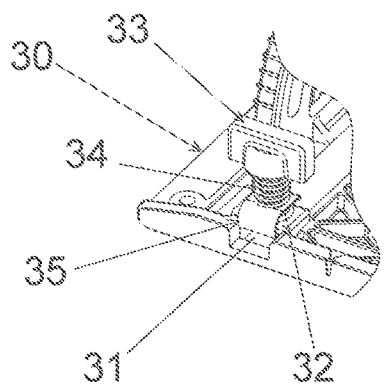
FIG. 6 is an enlarged perspective view of a main part of the power tool 1.
Figure 7:
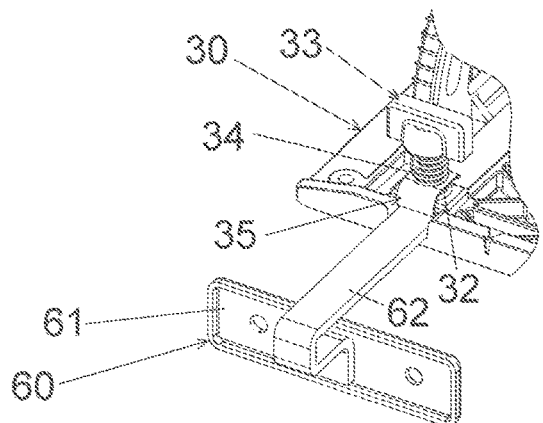
FIG. 7 is perspective view showing a state in which an extension part 62 of an auxiliary member 60 is inserted into an insertion part 31 of FIG. 6.

This embodiment relates to a power tool 1. The front and rear direction, the up and down direction, and the left and right direction which are orthogonal to each other in the power tool 1 are defined by FIGS. 1 to 3 and FIG. 5. The front and rear direction is the work direction of the power tool 1. The up and down direction is the direction perpendicular to a base (base pedestal) 30. The left and right direction is defined based on the case in which the front direction (cutting progress direction) is viewed. Additionally, FIGS. 1 and 5 show a state in which a battery pack 51 is attached to the power tool 1, but FIG. 3 shows a state in which the battery pack 51 is not attached to the power tool 1.

The power tool 1 is a portable circular saw (portable cutting machine) and includes a main body 10 and a base 30. The main body 10 is connected and supported to the base 30 by a well-known tilting support mechanism 20 and swing support mechanism 25. The main body 10 can be tilted in at least one direction of the left and right direction with respect to the base 30 by the support of the tilting support mechanism 20. Further, the main body 10 can swing in the up and down direction with respect to the base 30 by the support of the swing support mechanism (the cut depth adjustment mechanism) 25. The base 30 is a substantially rectangular plate made of metal such as aluminum. The longitudinal direction of the base 30 is aligned to the work direction of the power tool 1. The bottom surface of the base 30 is a sliding surface with a workpiece (processed material). The housing (outer shell) of the main body 10 is composed of a motor housing 11, a handle housing 12, and a gear cover 13 that are combined and integrated with each other.

Figure 2:
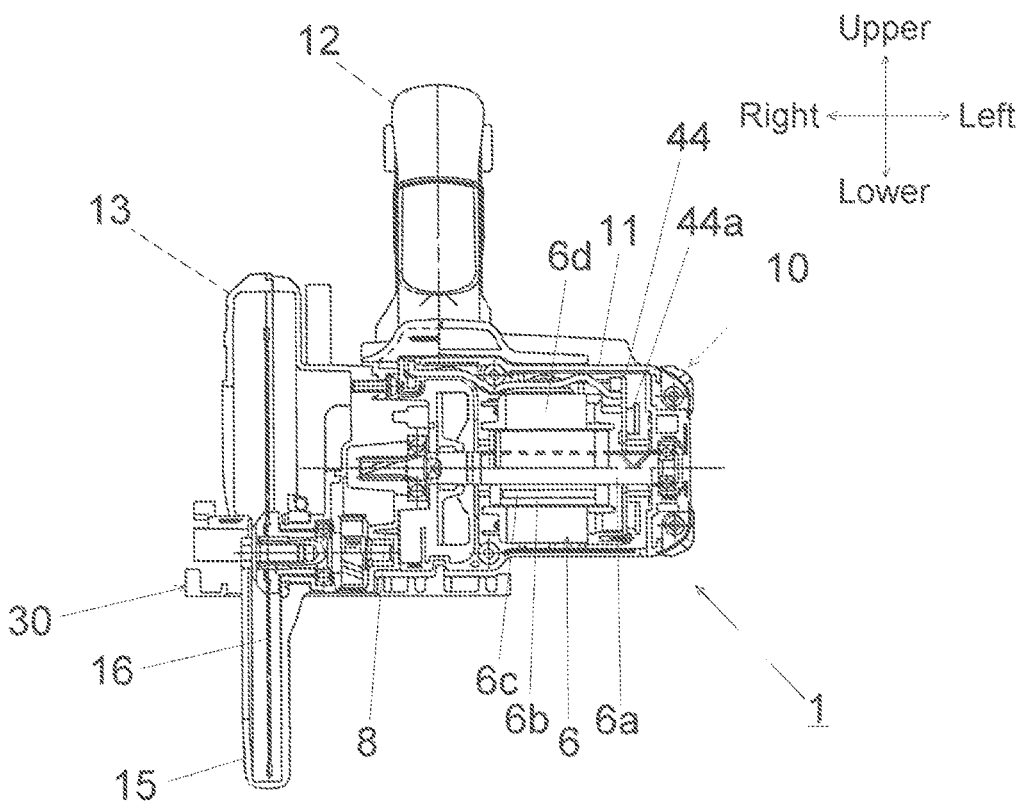
FIG. 2 is a front cross-sectional view of the power tool 1.
Figure 3:
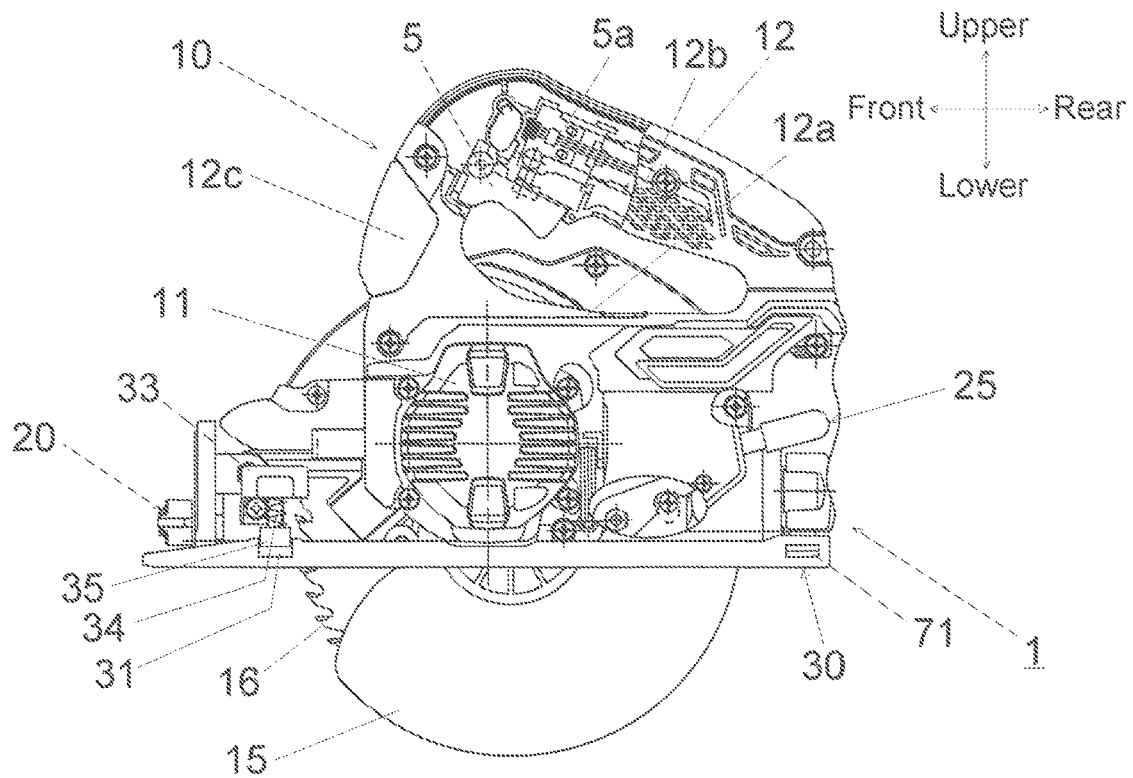
FIG. 3 is a left side view of the power tool 1.
Figure 4:
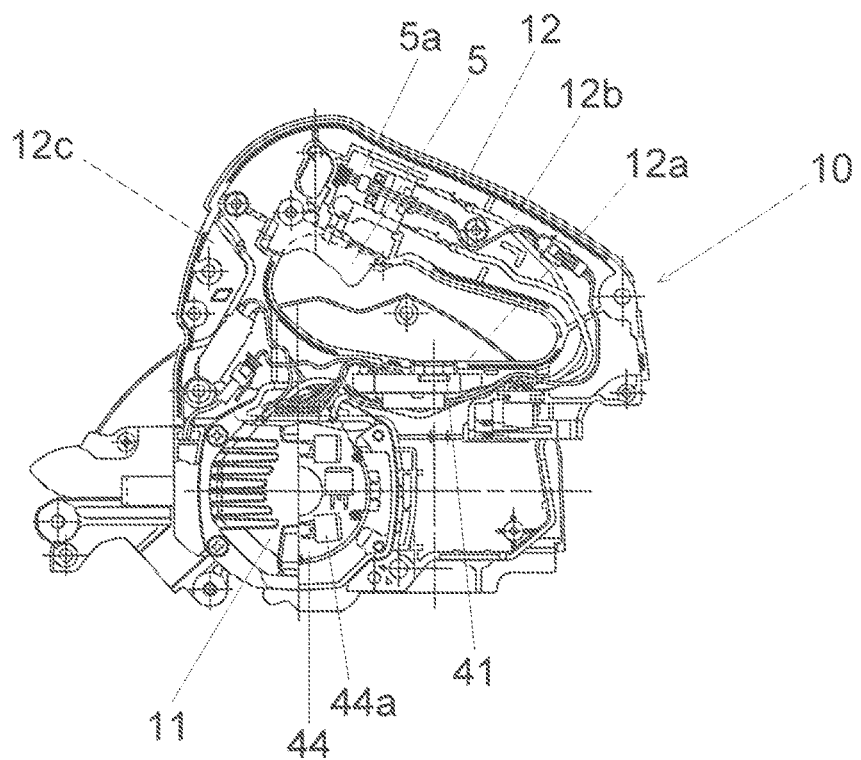
FIG. 4 is a left cross-sectional view of a main body 10 of the power tool 1.

The motor housing 11 is, for example, a resin molded body and accommodates a motor 6 shown in FIG. 2 therein. The motor 6 is an inner rotor type brushless motor and includes a rotor core 6b which is provided around an output shaft 6a by a magnetic material to rotate together with an output shaft 6a. A rotor magnet (permanent magnet) 6c is inserted and held by the rotor core 6b. The rotor magnet 6c is provided at a plurality of positions (for example, four) at equal intervals (for example, an interval of 90°) around the shaft. A stator core 6d is provided around the rotor core 6b (to be fixed to the motor housing 11). A stator coil (not shown) is provided in the stator core 6d. An inverter circuit board 44 is provided on the left side of the stator core 6d to be substantially perpendicular to the output shaft 6a. A plurality of (for example, six) switching elements 44a such as FETs or IGBTs is mounted on the inverter circuit board 44.

the handle housing 12 is, for example, a resin molded body having a left-right split structure and is connected to the gear cover 13. The handle housing 12 includes a base part 12a which is connected to the motor housing 11 and the gear cover 13 and accommodates a control board 41 (FIG. 4), a handle part 12b which is a grip part, and a connection part 12c which connects a front end of the handle part 12b and the base part 12a. An operation panel 17 is provided on the upper surface of the base part 12a. Although not shown in the drawings, the operation panel 17 is provided with a switch for switching the operation mode of the power tool 1 and the light on/off state, an LED for displaying various statuses, and the like. The rear end of the base part 12a and the rear end of the handle part 12b are connected to each other. The handle part 12b is provided with a trigger part (operation part) 5 for the user to switch between driving and stopping the motor. A switch 5a (FIG. 4) which is turned on and off by the trigger part 5 is provided in the handle part 12b. The battery pack 51 (FIGS. 1 and 5) which is a power source is slidably attached to the rear end of the handle housing 12 so as to be detachable from the rear.

The gear cover 13 is made of metal such as aluminum and is connected to the handle housing 12. The gear cover 13 covers a deceleration mechanism 8 (FIG. 2) which decelerates the rotation of the motor 6 and transmits the rotation to the saw blade (cutting blade) 16 and covers the upper half part of the saw blade 16. The protection cover 15 is, for example, a resin molded body and covers the lower half of the saw blade 16 so as to be openable and closable. The saw blade 16 which is a tip tool (rotating tool) is a disk-shaped rotary blade which is rotationally driven by the motor 6. The saw blade 16 protrudes downward from the lower surface of the base 30.

Figure 8:
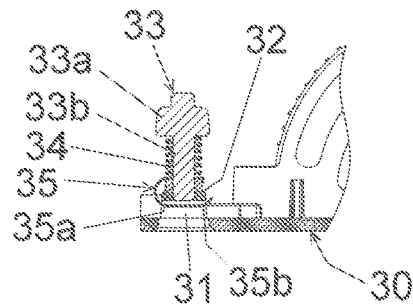
FIG. 8 is an enlarged cross-sectional view of a main part of the power tool 1 cut in a cross-section perpendicular to the front and rear direction including the insertion part 31.
Figure 9:
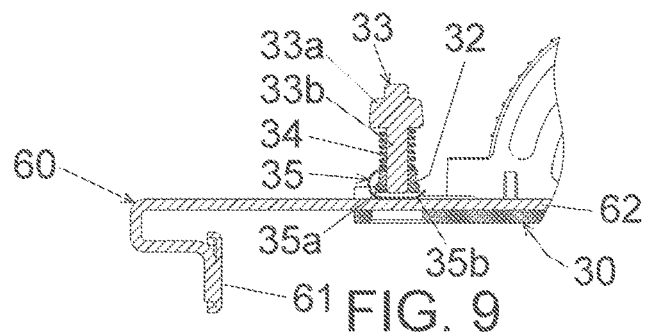
FIG. 9 is a cross-sectional view showing a state in which the extension part 62 of the auxiliary member 60 is inserted into the insertion part 31 of FIG. 8.
Figure 10:
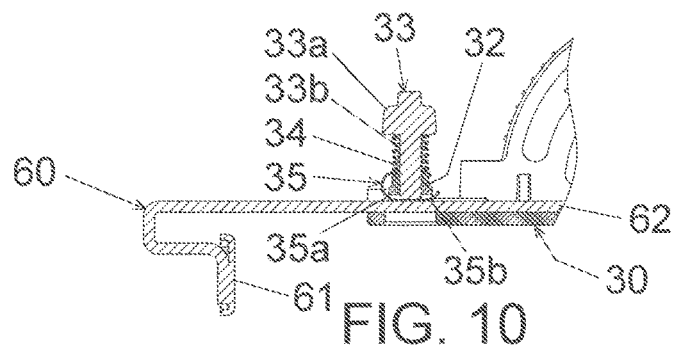
FIG. 10 is a cross-sectional view showing a state in which a wing bolt 33 of FIG. 9 is tightened.
Figure 11:
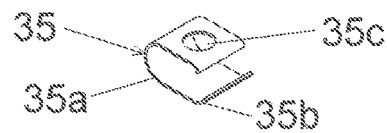
FIG. 11 is a perspective view of a leaf spring 35.
Figure 12:
FIG. 12 is a plan view of the leaf spring 35.
Figure 13:
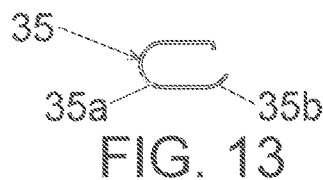
FIG. 13 is a rear view of the leaf spring 35.

The front part of the base 30 is provided with an insertion part 31 which extends in parallel to the left and right direction. As shown in FIGS. 6 to 10, a screw boss part 32 is provided at the left front part of the base 30 to straddle the upper part of the insertion part 31 in the front and rear direction. A wing bolt 33 is screwed to the screw boss part 32. The wing bolt 33 constitutes a main pressing part of the pressing mechanism. As shown in FIGS. 8 to 10, the wing bolt 33 includes a head part 33a and a shaft part 33b. The head part 33a is a part allowing an operator to fasten and release the wing bolt 33 by rotating the wing bolt 33. The shaft part 33b is a screw shaft which engages with a screw hole of the screw boss part 32. The axial direction of the shaft part 33b is parallel to the up and down direction. A coil spring 34 is provided around the shaft part 33b. The coil spring 34 is a member for maintaining the posture of the wing bolt 33.

The leaf spring 35 constitutes an auxiliary pressing part of the pressing mechanism of the invention. The leaf spring 35 is attached (locked) to the screw boss part 32. The leaf spring 35 has a U shape that opens to the right and straddles the top and bottom of the screw boss part 32. The upper surface part of the leaf spring 35 is sandwiched between the upper surface part of the screw boss part 32 and the lower end of the coil spring 34. Since the coil spring 34 regulates the upward movement of the leaf spring 35 (the movement away from the auxiliary member 60) and the rotation around the up and down direction of the leaf spring 35, rattling in the rotation direction around the up and down direction is suppressed. The lower surface part of the leaf spring 35 is preferably a flat surface, is located below the screw boss part 32, and faces the insertion part 31. The leaf spring 35 includes a first curved part 35a, a second curved part 35b, and a through-hole 35c. The through-hole 35c is provided on the upper surface part of the leaf spring 35. The shaft part 33b of the wing bolt 33 penetrates the through-hole 35c and is screwed to the screw hole of the screw boss part 32. The first curved part 35a is a part that rises from the left end of the lower surface part of the leaf spring 35 and is curved to protrude toward the lower left side (the side of the leaf spring 35). The second curved part 35b is a part that rises from the right end of the lower surface part of the leaf spring 35 and is curved to protrude toward the lower right side (the side of the leaf spring 35). The first curved part 35a and the second curved part 35b are provided to suppress the catching of the extension part 62 of the auxiliary member 60 with respect to the insertion part 31 at the time of insertion and removal and to facilitate the insertion and removal.

The auxiliary member 60 is attachable to the base 30. The auxiliary member 60 is a guide for cutting in parallel to the side surface of the workpiece. The auxiliary member 60 includes a guide surface 61 and an extension part (guide bar) 62. The guide surface 61 is a surface which is perpendicular to the left and right direction and contacts the side surface of the workpiece. The extension part 62 is a bar-shaped part that extends from the guide surface 61 and a part extending in parallel to the left and right direction is inserted into the insertion part 31 of the base 30 (to engage with the base 30). The extension part 62 which is inserted into the insertion part 31 is pressed by the wing bolt 33 and the leaf spring 35 so that the auxiliary member 60 is fixed to the base 30. Hereinafter, the procedure for fixing the auxiliary member 60 to the base 30 will be described.

As shown in FIG. 8, the wing bolt 33 is loosened so that the lower end of the shaft part 33b of the wing bolt 33 is separated from the lower surface part of the leaf spring 35 before the attachment of the auxiliary member 60. In this state, the extension part 62 of the auxiliary member 60 is inserted into the insertion part 31 of the base 30. At this time, since the extension part 62 is inserted into the insertion part 31 while engaging with the first curved part 35a, catching and scratching are suppressed. The upper surface of the extension part 62 inserted into the insertion part 31 preferably contacts the lower surface part of the leaf spring 35 and presses the lower surface part of the leaf spring 35 upward. Accordingly, the leaf spring 35 is elastically deformed. Thus, the elastic biasing force of the leaf spring 35 is applied to the extension part 62 as a pressing force from above and a weak resistance acts on the front and rear direction, the left and right direction, and the rotation direction of the auxiliary member 60. The resistance is the resistance that suppresses the movement of the auxiliary member 60 when the base 30 is tilted or vibrated while allowing the movement of the auxiliary member 60 by the operator. Additionally, the movement of the auxiliary member 60 in the front and rear direction is regulated by the front and rear wall surfaces of the insertion part 31. However, it is inevitable that the auxiliary member 60 can be slightly moved in the front and rear direction and rotatable around the up and down direction in the insertion part 31 in order to smoothly attach the extension part 62. However, according to the invention, the movement in the front and rear direction or the rotation around the up and down direction of the auxiliary member 60 is suppressed by the elastic biasing force of the leaf spring 35. Even when there is rattling in the up and down direction of the auxiliary member 60, the rattling is suppressed by the elastic biasing force of the leaf spring 35.

As shown in FIG. 9, the extension part 62 is inserted into the insertion part 31 until the guide surface 61 is located at a desired position and then the wing bolt 33 is tightened as shown in FIG. 10. Accordingly, the lower end of the shaft part 33b of the wing bolt 33 contacts the lower surface part of the leaf spring 35 and presses the extension part 62 from above through the lower surface part of the leaf spring 35. By tightening the wing bolt 33 with sufficient strength, the auxiliary member 60 can be firmly fixed to the base 30.

The operator can change a pressing force from the wing bolt 33 to the auxiliary member 60 by changing the position of the wing bolt 33 (the relative position with the auxiliary member 60) in the pressing direction (the up and down direction). The lower end of the shaft part 33b of the wing bolt 33 is a contact part that gives a pressing force to the auxiliary member 60 and moves in a direction intersecting the pressing direction in accordance with a change in the position of the pressing direction of the wing bolt 33 (a change in the fixed state of the wing bolt 33), specifically, rotates around the up and down direction.

The leaf spring 35 gives a predetermined pressing force to the auxiliary member 60 even when there is no pressing force from the wing bolt 33 to the auxiliary member 60 (even when the lower end of the shaft part 33b of the wing bolt 33 is separated from the lower surface part of the leaf spring 35). The rotation of the leaf spring 35 around the up and down direction is regulated by the front and rear wall surfaces of the insertion part 31. When fixing the auxiliary member 60, the wing bolt 33 presses the extension part 62 in a rotation state, but since the lower surface part of the leaf spring 35 regulated from rotating around the up and down direction is interposed between the shaft part 33b and the upper surface of the extension part 62, the rotating force of the wing bolt 33 around the up and down direction is not transmitted to the upper surface of the extension part 62 and the lower end of the shaft part 33b does not rotate while directly coming into contact with the upper surface of the extension part 62.

According to this embodiment, the following effects can be obtained.

(1) Since the leaf spring 35 is interposed between the lower end of the shaft part 33b of the wing bolt 33 and the upper surface of the extension part 62, it is possible to suppress the rotating force (torque) of the shaft part 33b from being transmitted to the auxiliary member 60 in the process of pressing the upper surface of the extension part 62 by the lower end of the shaft part 33b by tightening (rotating) the wing bolt 33. Therefore, it is possible to suppress the slight positional change or the movement of the auxiliary member 60 in the rotation direction when fixing the wing bolt 33 and to suppress the influence on the cutting accuracy.

(2) Since the leaf spring 35 is interposed between the lower end of the shaft part 33b of the wing bolt 33 and the upper surface of the extension part 62, it is possible to prevent the lower end of the shaft part 33b from rotating while directly contacting the upper surface of the extension part 62 of the auxiliary member 60. Therefore, it is possible to suppress the upper surface of the extension part 62 of the auxiliary member 60 from being deformed or damaged by the lower end of the shaft part 33b.

(3) Since the leaf spring 35 applies an elastic biasing force to the extension part 62 of the auxiliary member 60 inserted into the insertion part 31 even in a state in which the wing bolt 33 is loose (a state in which the wing bolt 33 does not press the extension part 62 of the auxiliary member 60), it is possible to suppress the auxiliary member 60 from being displaced until the wing bolt 33 is tightened after the auxiliary member 60 is set to a desired position. Therefore, the fixing work of the auxiliary member 60 is easy and the fixing accuracy is also easy to be improved.

(4) Since the leaf spring 35 includes the first curved part 35a, it is possible to suppress catching and scratching when the extension part 62 of the auxiliary member 60 is inserted into the insertion part 31 of the base 30 and to facilitate the insertion of the extension part 62 into the insertion part 31. Further, since the leaf spring 35 includes the second curved part 35b, it is possible to suppress catching and scratching when the extension part 62 is extracted from the insertion part and to facilitate the extraction of the extension part 62 from the insertion part 31.

Hereinafter, the power tool 1 will be supplementarily described. The rear part of the base 30 is provided with an insertion part 71 which extends in parallel to the left and right direction. A screw boss part 72 is provided on the right rear part of the base 30 to straddle the upper part of the insertion part 71 in the front and rear direction. A wing bolt 73 is screwed to the screw boss part 72. The axial direction of the wing bolt 73 is parallel to the up and down direction. A coil spring 74 is provided around the shaft part of the wing bolt 73. The coil spring 74 is a member for maintaining the posture of the wing bolt 73. Although not shown in the drawings, the same leaf spring may be also provided in the screw boss part 72 similarly to the case in which the leaf spring 35 is provided in the screw boss part 32. For example, when the guide surface 61 of the auxiliary member 60 is long in the front and rear direction, the extension part 62 extending in the left and right direction may be provided in the front and rear direction. In such a case, the rear extension part 62 is inserted into the insertion part 71 and the wing bolt 73 is tightened. At this time, when the leaf spring is also provided in the screw boss part 72, it is possible to obtain the same operation and effect as in the case in which the leaf spring 35 is provided in the screw boss part 32.

Although the invention has been described above by taking the embodiment as an example, it will be understood by those skilled in the art that various modifications can be made to each component and each processing process of the embodiment within the scope of the claims. Hereinafter, modified examples are obtained.

The auxiliary member is not limited to the guide exemplified in the embodiment and may be a sub-base having an effect of pseudo-increasing the area of the lower surface of the base or another type having a different shape. The power tool of the invention is not limited to the cordless type that operates by the electric power of the detachably attached battery pack, and may be the corded type that operates by the electric power supplied from the external AC power source. Further, the invention can be also applied to other power tools having a base, such as a jigsaw. Further, the pressing direction of the auxiliary pressing part (leaf spring) of the invention is the down direction, but if the same effect is obtained, the pressing direction may be freely set.

The invention claimed is:

1. A power tool comprising:
   a main body part which supports a motor and a cutting blade;
   a base pedestal which supports the main body part and includes a sliding surface slidable on a processed material;
   an auxiliary member that is attachable to the base pedestal and includes at least one guide surface;
   a boss part which is provided in the base pedestal;
   a pressing member which has a shaft part penetrating through the boss part in an up and down direction, and of which an up and down position changes with respect to the boss part by rotating around the shaft part; and
   an intervening member which is attached to the boss part to straddle top and bottom of the boss part and has a lower surface part located between a lower end of the shaft part and the auxiliary member and movement of an upper surface part from the boss part is regulated by penetration of the shaft part,
   wherein by rotating the pressing member, a pressing force of the pressing member is exerted to the auxiliary member via the lower surface part of the intervening member.

2. The power tool according to claim 1,
   wherein the auxiliary member includes an extension part which extends from the guide surface and is engageable with the base pedestal, and
   wherein the pressing member presses the extension part.

3. The power tool according to claim 2,
   wherein the base pedestal includes an insertion part into which the extension part is inserted, and
   wherein the lower surface part is located at the insertion part and has a rising part at an end or another end in an extending direction of the extension part.

4. The power tool according to claim 1,
   wherein the pressing member has a head part connected with the shaft part,
   wherein the head part regulates a movement of the intervening member toward a direction away from the auxiliary member.

5. The power tool according to claim 1,
   wherein the upper surface part is engaged with an upper part of the boss part.

* * * * *